(12) United States Patent
Robinson et al.

(10) Patent No.: US 7,525,874 B2
(45) Date of Patent: Apr. 28, 2009

(54) METHOD FOR CONVERTING SEISMIC DATA FROM THE TIME DOMAIN TO THE DEPTH DOMAIN

(75) Inventors: Gary Charles Robinson, Aurora, CO (US); Volodya Litvinov, Minsk (BY); Udo G. Araktingi, Parker, CO (US)

(73) Assignee: Prism Seismic Inc., Centennial, CO (US)

( * ) Notice: Subject to any disclaimer, the term of this patent is extended or adjusted under 35 U.S.C. 154(b) by 253 days.

(21) Appl. No.: 11/736,470

(22) Filed: Apr. 17, 2007

(65) Prior Publication Data

US 2007/0247973 A1 Oct. 25, 2007

Related U.S. Application Data

(60) Provisional application No. 60/793,773, filed on Apr. 21, 2006.

(51) Int. Cl.
*G01V 1/36* (2006.01)
(52) U.S. Cl. .................. 367/51; 367/50; 367/54
(58) Field of Classification Search .............. 367/50–54
See application file for complete search history.

(56) References Cited

U.S. PATENT DOCUMENTS 4,964,103 A * 10/1990 Johnson ............... 367/50
5,648,937 A * 7/1997 Campbell ............. 367/51
5,754,493 A 5/1998 Al-Chalabi

OTHER PUBLICATIONS

Taylor, R., D. Kelly, N. Fisher, and A. Canning, 1998, The application of reflection tomography and interval velocity analysis to achieve accurate depth conversion of subtle structures: a case study: Exploration Geophysics, 29, No. 3/4, 626-631.

Hegge, R. F., and J. T. Fokkema, 1996, Macro model updating by global inversion of CFP operators: 66th Annual International Meeting, SEG, Expanded Abstracts, 707-710.

McCorkindale, D., and L. F. Hwang, 1994, Velocity estimation for depth conversion of a 3-D data set in Troll field: A comparison of different techniques: 64th Annual International Meeting, SEG, Expanded Abstracts, 487-490.

(Continued)

*Primary Examiner*—Ian J Lobo
(74) *Attorney, Agent, or Firm*—Dorr, Carson & Birney, P.C.

(57) ABSTRACT

A method is used to convert seismic data between bounding upper and lower surfaces in the time domain to the depth domain. An upper depth surface corresponding to the upper time surface is determined, either from well data or by time-depth conversion of the upper time surface. An interval velocity value is determined for each seismic sample between the bounding time surfaces from velocity data generated from well logs. The seismic times between the bounding time surfaces are then converted to the depth domain by adding the thickness of each seismic sample to the upper depth surface, wherein the thickness of each seismic sample is a function of the seismic sample rate and interval velocity value for each seismic sample. The seismic attribute values from the converted seismic data can be interpolated to a linear depth sampling.

20 Claims, 5 Drawing Sheets

OTHER PUBLICATIONS

David, B. K., and R. Binks, 1994, Depth conversion in rapidly deepening water with application to the Seychelles: 64th Annual International Meeting, SEG, Expanded Abstracts, 491-493.

Cognot, R., P. Thore, and A. Haas, 1994, Tying seismic to well data using structural uncertainties: 64th Annual International Meeting, SEG, Expanded Abstracts, 494-497.

Japsen, P., 1992, Seismic velocities and depth conversion: The Cenozoic (excl. Danian) of the Danish central trough, North Sea: 62nd Annual International Meeting, SEG, Expanded Abstracts, 244-247.

Wolf, D. J., and J. D. Logel, 1991, Geostatistics and depth conversion in the southern North Sea: 61th Annual International Meeting, SEG, Expanded Abstracts, 251-254.

Whitcombe, D. N., 1991, Fast and accurate model building using de-migration and single step raytrace migration: 61st Annual International Meeting, SEG, Expanded Abstracts, 1295-1296.

Carter, M.D., and G. Hyatt, 1990, A comparison of depth conversion methods in the Gulf of Mexico: 60th Annual International Meeting, SEG, Expanded Abstract, 1253-1255.

van der Made, P. M., V. Budejickey, F. Bussemaker, G. L. Peels, T. T. van der Werff, and D. Zijlstra, 1990, Depth conversion using integrated seismic, well, and geological data: 60th Annual International Meeting, SEG, Expanded Abstracts, 1259-1262.

Guiziou, J. L., P. Compte, P. Guillamme, B. C. Scheffers, M. Riepen, and T. T. van der Werff, 1990, SISTRE: A time-to-depth conversion tool applied to structurally complex 3-D media; 60th Annual International Meeting, SEG, Expanded Abstracts, 1267-1270.

Thore, P., and E. Landa, 1990, Strategy for macromodel estimation: 60th Annual International Meeting, SEG, Expanded Abstracts, 1287-1289.

* cited by examiner

METHOD FOR CONVERTING SEISMIC DATA FROM THE TIME DOMAIN TO THE DEPTH DOMAIN

RELATED APPLICATION

The present application is based on and claims priority to the Applicant's U.S. Provisional Patent Application 60/793,773, entitled "Method For Converting Seismic Data From The Time Domain To The Depth Domain," filed on Apr. 21, 2006.

BACKGROUND OF THE INVENTION

1. Field of the Invention

The present invention relates generally to the field of geophysics. More specifically, the present invention discloses a method for converting seismic data from the time domain to the depth domain.

2. Statement of the Problem

Seismic data are widely used in petroleum and mineral exploration and development, as they provide detailed areal information used in planning exploration and development activities. Seismic data are recorded and evenly sampled in time—the time required for the energy to travel to the geophone or hydrophone from the initiation of the energy source. Values of seismic attributes, such as acoustic or elastic impedance, can be useful in building or constraining geologic models of rock properties. However, these rock property models are constructed in depth, not in time. The conversion from time to depth is non-trivial, as lateral variations in velocity and reflection static values add local complexity to the conversion from time to depth. These local complexities are not captured by smoothly varying velocity functions (or constant velocity functions) typically used in the time-depth conversion process.

In addition, log data recorded in wells are used to obtain information on the structure and physical attributes of the subsurface. However, seismic data are recorded in time, whereas log data are recorded in depth. In order to incorporate the seismic data information with the well data when generating geologic models in depth, the seismic data must necessarily be converted to depth.

Geophysicists have long converted time maps to depth, as maps in depth are required for use in exploration and development activities. This requires multiplying the one-way travel time obtained from the seismic data at each seismic trace by a corresponding velocity value to obtain a depth. Various methodologies, involving average and/or interval velocity functions, are used to convert the time maps to depth maps. However, converting a seismic data volume from time to depth requires a different procedure, as this involves a velocity-dependant resampling of the data as well as a conversion of the time axis values to depth values.

Solution to the Problem. The present invention addresses many of the shortcomings of the prior art in this field by providing a method for converting seismic data from the time domain to the depth domain that accommodates interval velocity information that can vary significantly from sample to sample in both lateral (spatial) and vertical (temporal) directions if necessary. This approach provides significantly improved accuracy in converting the seismic data volume to depth.

Additionally, for applications in the petroleum industry, only a selected interval, not the entire seismic time range, needs to be depth converted. The present methodology allows the user to convert a selected time range, delineated by an uppermost and lowermost seismic horizon, to be converted to depth. Additionally, the inclusion of additional intermediate horizons between the uppermost and lowermost horizons allows for handling complex stratigraphic relationships, such as truncation and onlap, where the zone does not exist everywhere within the seismic data.

SUMMARY OF THE INVENTION

This invention provides a method for converting seismic data between bounding upper and lower surfaces in the time domain to the depth domain. An upper depth surface corresponding to the upper time surface is determined, either from well data or by time-depth conversion of the upper time surface. An interval velocity value is determined for each seismic sample between the bounding time surfaces from velocity data generated from well logs. The seismic times between the bounding time surfaces are then converted to the depth domain by adding the thickness of each seismic sample to the upper depth surface, wherein the thickness of each seismic sample is a function of the seismic sample rate and interval velocity value for each seismic sample. The seismic attribute values from the converted seismic data can be interpolated to a linear depth sampling.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
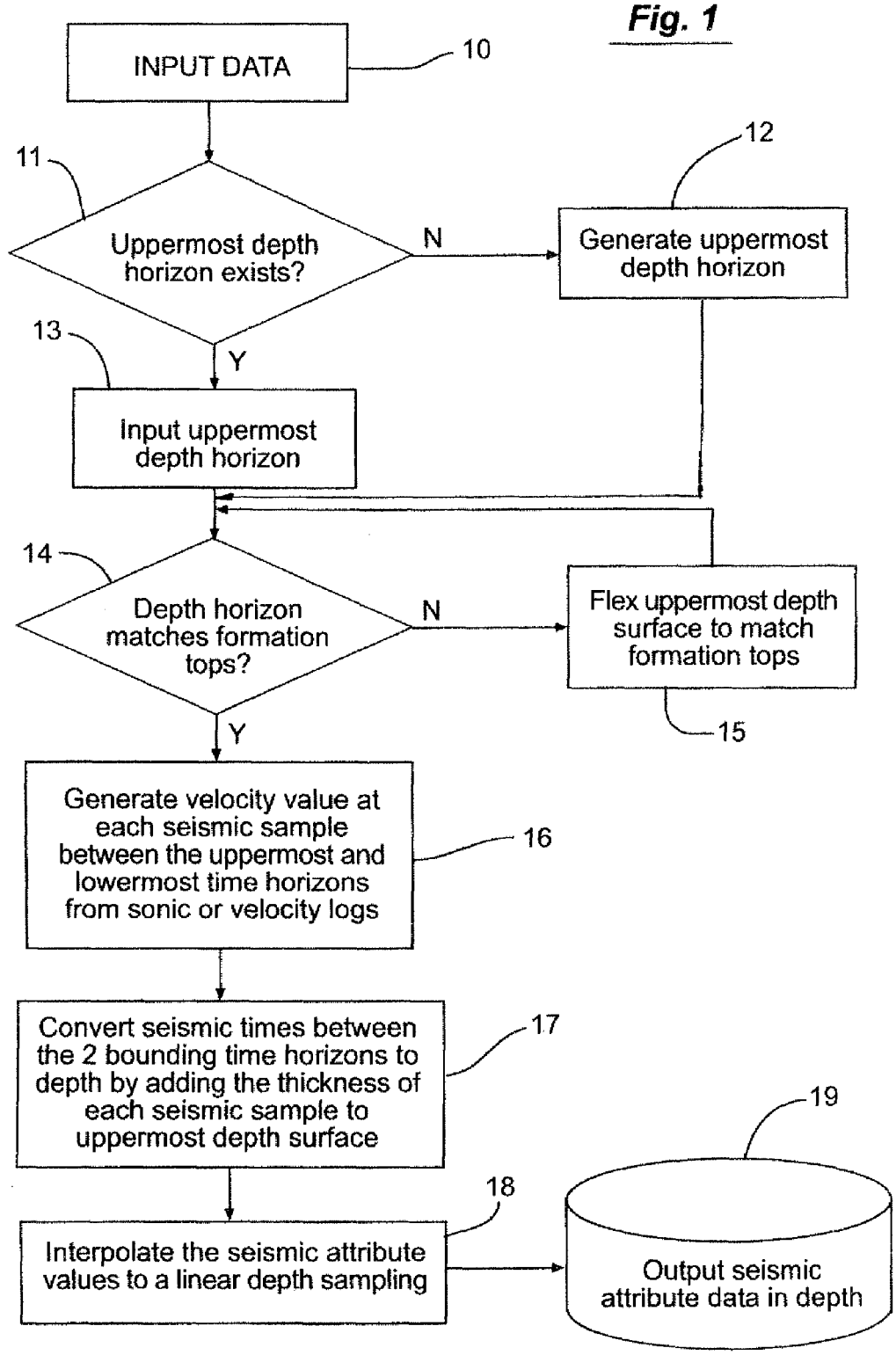
FIG. 1 is a simplified flowchart for the present time-to-depth conversion method.
Figure 2:
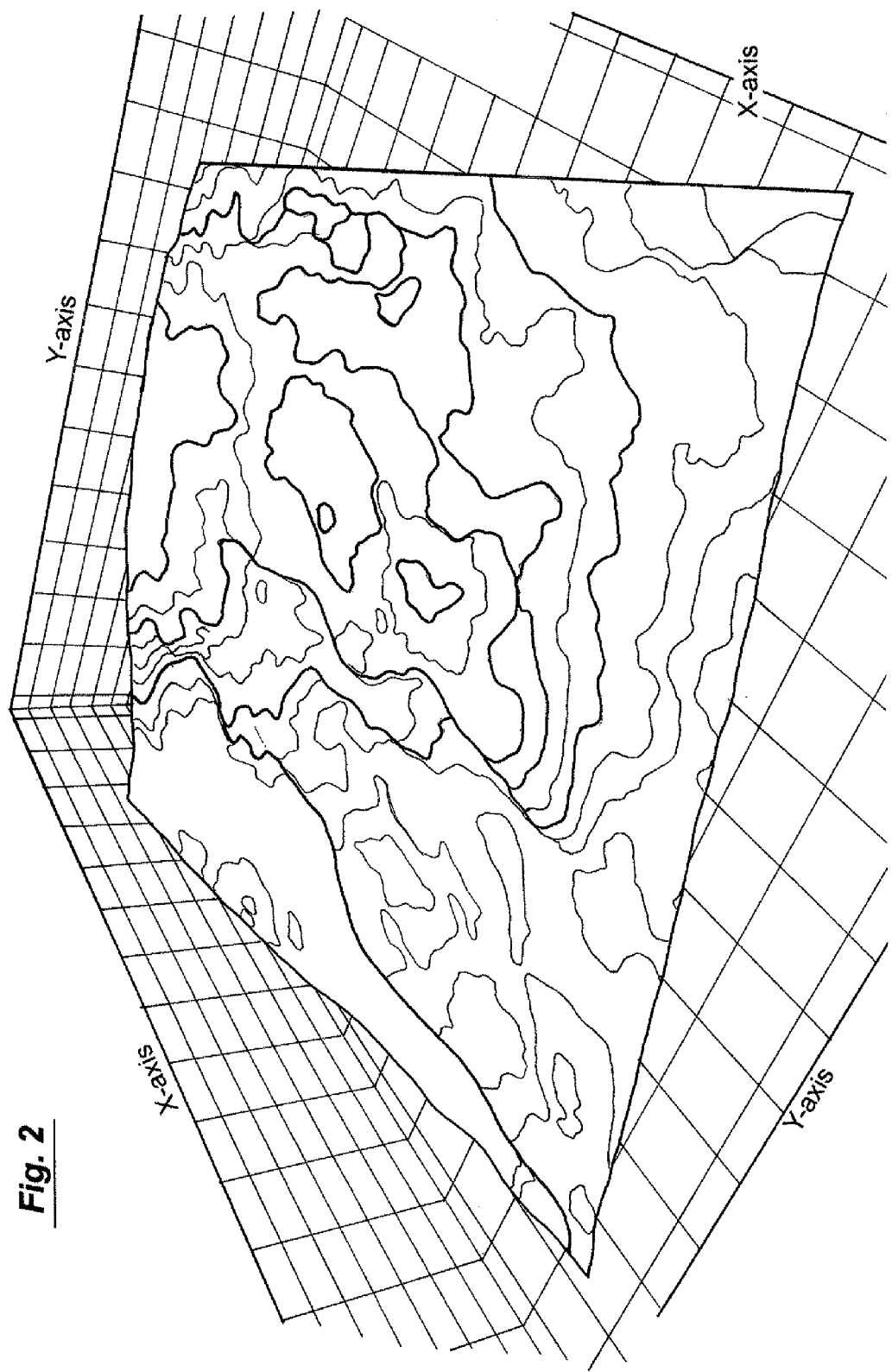
FIG. 2 is a 3-D graph of an example of an upper bounding time horizon.

Turning to FIG. 1, a flowchart is provided illustrating the present method for converting seismic data from the time domain to the depth domain. As an initial step 10, two time surfaces (i.e., the upper and lower time surfaces) that bound the seismic volume to be converted in depth are input. FIG. 2 is a 3-D graph of an example of an upper time surface. In addition, the formation tops in depth at the wells, sonic or velocity log data at the wells, and the seismic attribute to be depth converted are also input. Optionally, a number of additional time surfaces between the upper and lower time surfaces can be input.

A depth surface corresponding to the upper time surface can either be input or generated. If this upper depth surface already exists (step 11), this data is input in step 13. Alternatively, if the upper depth surface does not exist, it can be obtained by depth-converting the uppermost time surface, using any time-depth conversion technique for surfaces, or by directly generating a depth surface from well data concerning geologic formations (step 12).

In step 14, the upper depth surface is matched against the formation tops in depth at the wells to within an acceptable margin of error. It is possible to correct any errors in the depth of the surface at the wells using any number of methods to flex the depth surface to match the upper time surface at the wells (step 15). If the errors are statistically insignificant, this step may be omitted.

In step 16, an interval velocity value is generated at each time sample in the volume to be depth-converted using sonic or velocity logs at wells. This may be done using any available interpolation or estimation technique, such as inverse distance weighting or kriging. If more than two time horizons are used, the population of interval velocity values is done for each zone, where each zone is defined by upper and lower time horizons. This allows for unconformities and onlaps, which can truncate zones within the interval being depth-converted. If a geostatistical method is used for estimating the velocity values within the seismic time samples, then a seismic attribute, such as impedance or seismic velocity, may be used to condition the estimate of the interval velocity values.

In step 17, the seismic times are converted to the depth domain using the uppermost depth surface and the interval velocities at each time sample. The depth to any particular time sample is given by the following formula:

$$Depth_n = Depth_{Surf} + \sum_{j=1}^{n} Velocity_j * SampleRate/2$$

where:

$Depth_n$=Depth at the $n^{th}$ seismic sample below the upper surface at that trace location.

$Depth_{Surf}$=Depth at the upper surface at that trace location.

$Velocity_j$=Interval velocity (m/sec or ft/sec) of the $j^{th}$ sample below the upper surface at that trace location.

SampleRate=Sample rate in seconds of the seismic volume.

Finally, in step 18, the seismic attribute values are then interpolated to a linear depth sampling. This seismic attribute data in the depth domain can then be output in step 19 for subsequent use or further processing.

FIGS. 2-5 are three-dimensional graphs showing an example of the data at various stages of the depth conversion procedure. In this example, the input data were an upper and lower bounding time horizon, formation tops corresponding to the upper bounding time horizon, and sonic log data in the wells.

Figure 3:
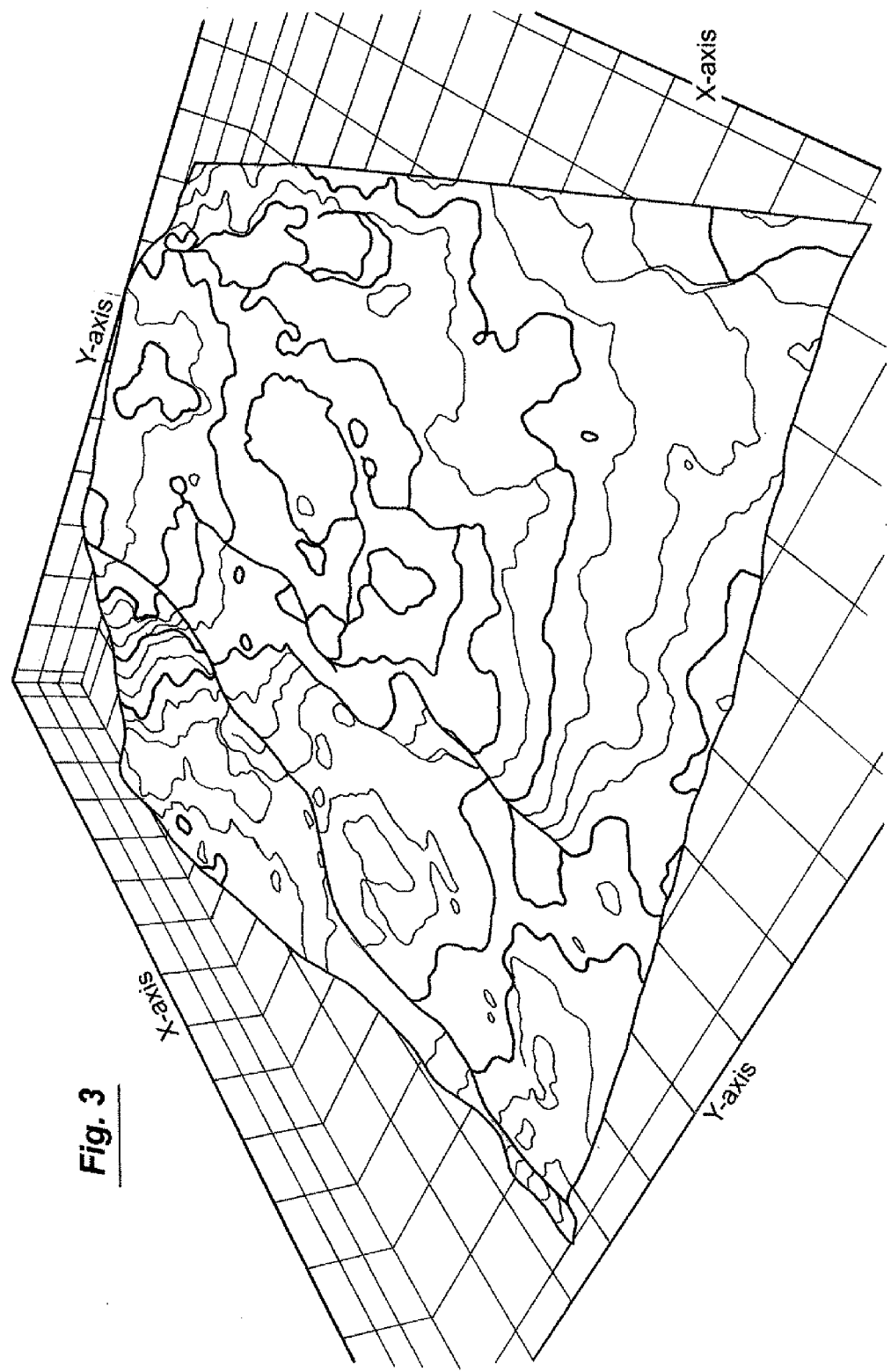
FIG. 3 is a 3-D graph of the depth surface generated from the upper time horizon data shown in FIG. 2 and the well formation tops.
Figure 4:
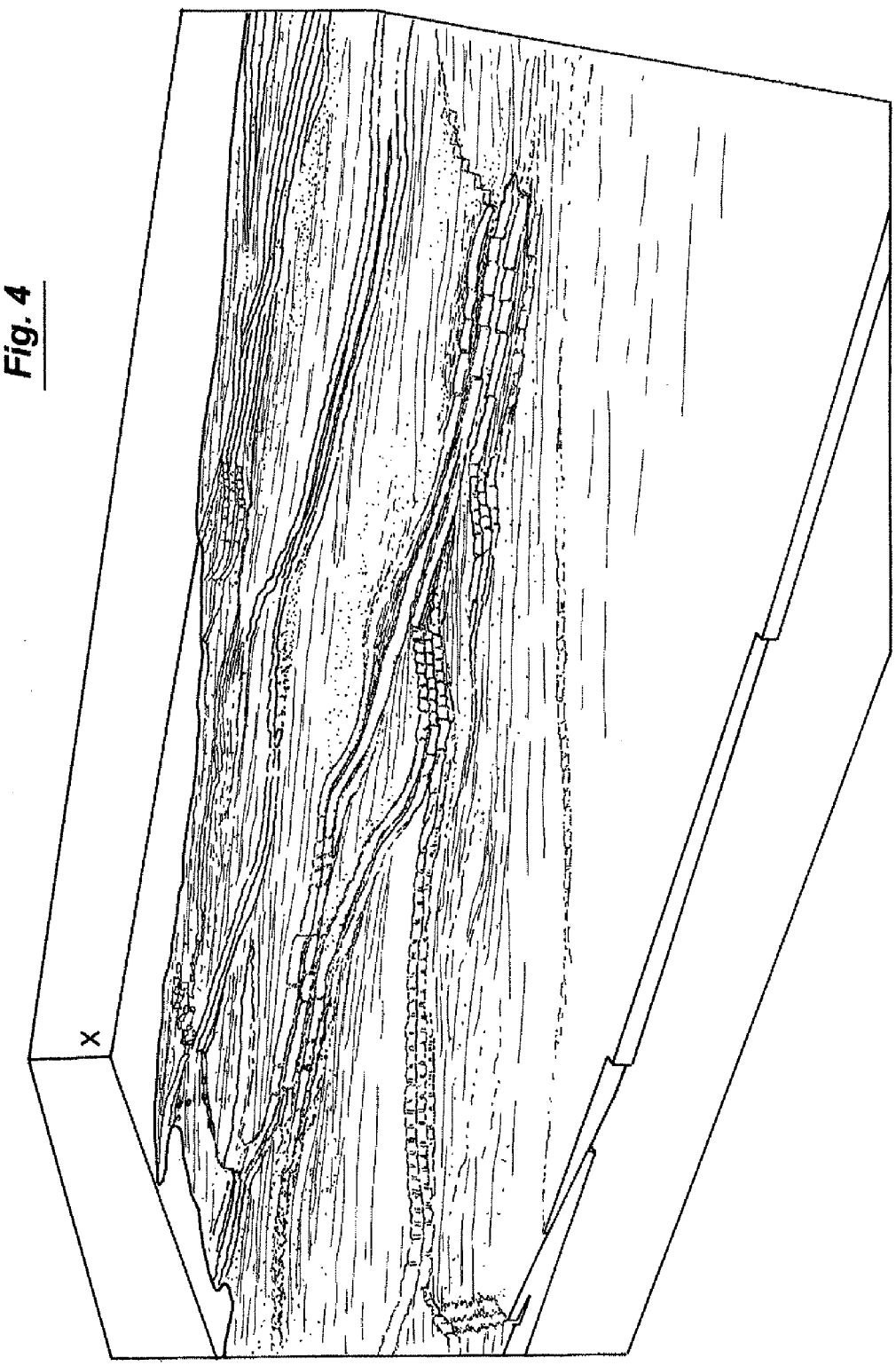
FIG. 4 is a 3-D graph of an example of input seismic attribute data in the time domain.
Figure 5:
FIG. 5 is a 3-D graph of the depth-converted seismic attribute data output from the present time-to-depth conversion method based on the input seismic attribute data in FIG. 4.

FIG. 4 displays the seismic attribute data in time between the bounding time horizons. FIG. 2 displays the upper bounding time horizon. FIG. 3 displays the depth surface generated from the upper bounding time horizon and the formation top data. FIG. 5 displays the seismic attribute data in depth output from the depth conversion procedure described above.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for converting seismic data between bounding upper and lower surfaces in the time domain to the depth domain, said method comprising:

determining an upper depth surface corresponding to the upper time surface;

generating an interval velocity value for each seismic sample between the upper and lower time surfaces from velocity data generated from well logs; and converting the seismic times between the bounding time surfaces to the depth domain by adding the thickness of each seismic sample to the upper depth surface, wherein the thickness of each seismic sample is a function of the seismic sample rate and interval velocity value for each seismic sample.

2. The method of claim 1 further comprising the subsequent step of interpolating seismic attribute values from the converted seismic data to a linear depth sampling.

3. The method of claim 1 wherein the upper depth surface is determined by converting the upper time surface to the depth domain.

4. The method of claim 3 further comprising the subsequent step of adjusting the upper depth surface to match well data concerning geologic formations.

5. The method of claim 1 wherein the upper depth surface is generated from well data concerning geologic formations.

6. The method of claim 1 wherein the interval velocity values are generated by kriging.

7. The method of claim 1 wherein the interval velocity values are generated by inverse distance weighting.

8. The method of claim 1 wherein the step of converting the seismic times to the depth domain further comprises:

$$Depth_n = Depth_{Surf} + \sum_{j=1}^{n} Velocity_j * SampleRate/2$$

wherein:

$Depth_n$=Depth at the $n^{th}$ seismic sample below the upper depth surface at that trace location;

$Depth_{Surf}$=Depth at the upper depth surface at that trace location;

$Velocity_j$=Interval velocity of the $j^{th}$ sample below the upper depth surface at that trace location; and SampleRate=Sample rate.

9. A method for converting seismic data between bounding upper and lower surfaces in the time domain to the depth domain, said method comprising:

determining an upper depth surface by time-depth conversion of the upper time surface;

adjusting the upper depth surface to match well data concerning geologic formations;

generating an interval velocity value for each seismic sample between the upper and lower time surfaces from velocity data generated from well logs; and converting the seismic times between the bounding time surfaces to the depth domain by adding the thickness of each seismic sample to the upper depth surface, wherein the thickness of each seismic sample is a function of the seismic sample rate and interval velocity value for each seismic sample.

10. The method of claim 9 further comprising the subsequent step of interpolating seismic attribute values from the converted seismic data to a linear depth sampling.

11. The method of claim 9 wherein the interval velocity values are generated by kriging.

12. The method of claim 9 wherein the interval velocity values are generated by inverse distance weighting.

13. The method of claim 9 wherein the step of converting the seismic times to the depth domain further comprises:

$$Depth_n = Depth_{Surf} + \sum_{j=1}^{n} Velocity_j * SampleRate/2$$

wherein:
Depth$_n$=Depth at the n$^{th}$ seismic sample below the upper depth surface at that trace location;
Depth$_{Surf}$=Depth at the upper depth surface at that trace location;
Velocty$_j$=Interval velocity of the j$^{th}$ sample below the upper depth surface at that trace location; and
SampleRate=Sample rate.

14. A method for converting seismic data within a seismic volume to the depth domain, said seismic volume being defined by a plurality of zones, with each zone having bounding upper and lower surfaces in the time domain, said method comprising:
determining an upper depth surface corresponding to the uppermost time surface;
generating an interval velocity value for each seismic sample between the upper and lower time surfaces for each zone from velocity data generated from well logs; and
converting the seismic times between the bounding time surfaces to the depth domain by adding the thickness of each seismic sample to the upper depth surface, wherein the thickness of each seismic sample is a function of the seismic sample rate and interval velocity value for each seismic sample within each zone.

15. The method of claim 14 further comprising the subsequent step of interpolating seismic attribute values from the converted seismic data to a linear depth sampling.

16. The method of claim 14 wherein the upper depth surface is determined by converting the upper time surface to the depth domain.

17. The method of claim 16 further comprising the subsequent step of adjusting the upper depth surface to match well data concerning geologic formations.

18. The method of claim 14 wherein the upper depth surface is generated from well data concerning geologic formations.

19. The method of claim 14 wherein the interval velocity values are generated by kriging.

20. The method of claim 14 wherein the step of converting the seismic times to the depth domain further comprises:

$$Depth_n = Depth_{Surf} + \sum_{j=1}^{n} Velocity_j * SampleRate/2$$

wherein:
Depth$_n$=Depth at the n$^{th}$ seismic sample below the upper depth surface at that trace location;
Depth$_{Surf}$=Depth at the upper depth surface at that trace location;
Velocity$_j$=Interval velocity of the j$^{th}$ sample below the upper depth surface at that trace location; and
SampleRate=Sample rate.

* * * * *